(12) United States Patent
Willcox et al.

(10) Patent No.: US 9,027,276 B2
(45) Date of Patent: May 12, 2015

(54) INSECT TRAP

(75) Inventors: John Cadman Willcox, West Midlands (GB); Mathew Varghese Kaye, West Midlands (GB)

(73) Assignee: Brandenburg Limited (GB)

( * ) Notice: Subject to any disclaimer, the term of this patent is extended or adjusted under 35 U.S.C. 154(b) by 823 days.

(21) Appl. No.: 12/990,620

(22) PCT Filed: Apr. 30, 2009

(86) PCT No.: PCT/GB2009/001097
§ 371 (c)(1),
(2), (4) Date: Nov. 1, 2010

(87) PCT Pub. No.: WO2009/133372
PCT Pub. Date: Nov. 5, 2009

(65) Prior Publication Data
US 2011/0041384 A1      Feb. 24, 2011

(30) Foreign Application Priority Data
May 2, 2008    (GB) .................................. 0808534.2

(51) Int. Cl.
*A01M 1/04*      (2006.01)
*A01M 1/14*      (2006.01)

(52) U.S. Cl.
CPC *A01M 1/04* (2013.01); *A01M 1/145* (2013.01)

(58) Field of Classification Search
USPC ................................ 43/107, 112–114, 132.1
See application file for complete search history.

(56) References Cited

U.S. PATENT DOCUMENTS

| | | | | |
|---|---|---|---|---|
| 5,425,197 A | * | 6/1995 | Smith | 43/113 |
| 5,722,199 A | * | 3/1998 | Demarest et al. | 43/113 |
| 5,950,355 A | * | 9/1999 | Gilbert | 43/113 |
| 6,108,966 A | | 8/2000 | Otomo et al. | |
| 2002/0073611 A1 | * | 6/2002 | Greening | 43/113 |
| 2003/0089024 A1 | | 5/2003 | Nelson et al. | |

(Continued)

FOREIGN PATENT DOCUMENTS

| | | |
|---|---|---|
| AU | 736705 B2 | 8/2001 |
| CN | 2766552 Y | 3/2006 |

(Continued)

OTHER PUBLICATIONS

Search Report for corresponding GB0808534.2.

(Continued)

*Primary Examiner* — Christopher P Ellis
(74) *Attorney, Agent, or Firm* — Rader, Fishman & Grauer PLLC (57) ABSTRACT

The invention relates to an insect trap which has been designed to facilitate simple and efficient servicing, maintenance and cleaning. The trap includes a back housing; a frame swing mounted to said housing; and a cover comprising openings allowing insects to enter the trap and the frame supports at least one light such that said frame and lights can be moved from a first position where they overlie the back housing, to a second position where they lie clear of the back housing such that an insect catching means which may be fitted over the back housing is readily accessible for replacement during servicing. Additionally, the trap is adapted for ease of servicing and jet cleaning by the provision of shields each of which sealably protect, from water ingress, the plurality of lights at the positions where they connect to electrical fittings.

25 Claims, 11 Drawing Sheets

(56) References Cited

U.S. PATENT DOCUMENTS

2007/0124987 A1* 6/2007 Brown et al. .................. 43/113
2008/0229652 A1* 9/2008 Willcox et al. ................ 43/113

FOREIGN PATENT DOCUMENTS

| | | | |
|---|---|---|---|
| CN | 2790173 | Y | 6/2006 |
| DE | 3810065 | C1 | 4/1989 |
| EP | 1212942 | A1 | 6/2002 |
| EP | 1457111 | A1 | 9/2004 |
| GB | 2171882 | A * | 9/1986 |
| GB | 2275409 | A * | 8/1994 |
| JP | S48-32440 | U | 4/1973 |
| JP | H11-46657 | A | 2/1999 |
| JP | 2000-245322 | A | 9/2000 |
| JP | 2005046045 | A | 2/2005 |
| JP | 2007-8 | A | 1/2007 |
| KR | 10-0538043 | B1 | 12/2005 |
| KR | 10-0707929 | B1 | 4/2007 |
| WO | WO-9220224 | A1 | 11/1992 |

OTHER PUBLICATIONS

English abstract for DE-3810065.
International Search Report for PCT/GB2009/001097.
English abstract for JP-2005046045.
English abstract for JP2007-8.
English abstract for JP H11-46657.
Korean Office Action for KR 10-1391801, mailed Aug. 21, 2014.
Japanese Office Action for JP 2011-506770, mailed Aug. 12, 2013.
English abstract for CN-2790173 as part of Korean Office Action mailed Aug. 21, 2014.
English abstract for CN-2766552-Y.
English abstract for KR-10-0538043-B1 as part of Korean Office Action mailed Aug. 21, 2014.
English abstract for KR-10-0707929-B1 as part of Korean Office Action mailed Aug. 21, 2014.

* cited by examiner

INSECT TRAP

CROSS-REFERENCES TO RELATED APPLICATIONS

This application claims priority to United Kingdom application 0808534.2 filed on May 2, 2008, and PCT EP/2009/001097 filed on Apr. 30, 2009, both of which are hereby incorporated by reference in their entirety.

TECHNICAL FIELD

The present invention relates to an insect trap and more particularly to an insect trap which has been designed to facilitate simple and efficient servicing, maintenance and cleaning.

BACKGROUND OF THE INVENTION

Insect traps of various types are well known. A particularly common trap type, particularly for flying insects, comprises an insect attractant means, such as, for example a UV light source and an insect trapping means, such as, for example an adhesive board or paper contained in a housing. The flying insects are attracted to the trap, enter the housing through openings and get caught on the trapping means. To maintain efficiency of capture, the adhesive board or paper needs to be regularly replaced and the trap cleaned. The adhesive board or paper also needs to be inspected and records kept. The lights also need to be cleaned as insects get "welded" to the bulbs and in any case, the lights have a limited life span.

The traps are often fitted outdoors or in factories, and are mounted on walls to an electricity supply. Therefore, if they are to be cleaned with water, or the factories experience jet washing of floors and walls, the electrical contacts need to be isolated to avoid risk of electrocution. In some traps, a "sealable" cover is screwed from each light over each respective electrical contact. This means a person servicing the traps needs to unscrew two caps for each light and there are often at least two and more typically at least three lights per trap. Additionally, since the lights are positioned in front of the glue board on a housing base, access can be difficult and the job unpleasant.

It is an object of the present invention to provide one or more traps which allow for simple and efficient servicing maintenance and cleaning. It is a separate object to make identification of e.g. the number and/or type of captured insects easier and to facilitate good record keeping.

PRESENT INVENTION

According to a first aspect of the present invention there is provided a trap for catching insects comprising
a. a back housing;
b. a frame, swing mounted to said housing; and
c. a cover comprising openings allowing insects to enter the trap wherein said frame supports one or a plurality of lights such that said frame and lights can be moved from a first position, where they overlie the back housing, to a second position where they lie clear of the back housing such that an insect catching means, which may be fitted over the back housing, is readily accessible for replacement during servicing.

By supporting the lights on a separate frame, which can be swung away from the back housing, allows easier access to both the lights and the insect catching means. In particular, it avoids a requirement when mounting the trap to provide sufficient clearance above the trap to allow for fitting of the insect catching means.

Typically, one or a plurality of reflectors is fitted behind the one or more lights and the novel construction allows for these to be fitted in a manner allowing for quick release and easy maintenance. In this regard, the reflectors may be supported by opposing retaining stops a gap there between being accessed by flexing the reflector so it "snap locks" into the gap between the opposing stops.

The frame preferably takes the form of a light weight perimeter frame and comprises a flanged handle at a side opposite to that which is hinged to the back housing. It comprises ducting or channels which communicate with the back housing in a manner which prevents water ingress. It is through these channels that the electric wiring is ducted and the channels are then appropriately sealed.

Preferably, the back housing is shaped so that it can also receive fluorescent high frequency electronic ballast. Such ballast is carbon friendly, provides for flicker free start of the lights, offers higher UV output and avoids the need for a starter.

In a favoured embodiment, two traps of the invention may be connected back to back such that they can be suspended.

To prevent the risk of accidental breakage of the lights on opening, the trap is designed to limit the degree of swing of the frame. This may be achieved by the provision of a stop. It is also held in a shut position by means of a retaining mechanism, such as a magnetic lock.

Preferably the trap further comprising a mechanism which prevents removal of the cover until the frame has been moved from it's closed position. This prevents accidental displacement of the cover, thereby reducing the possibility of cover breakage.

The inner face of the back housing preferably comprises a means for raising the insect capture means there from at a number of points so as to ease its removal. Such raised means may comprise protrusions such as pimples or ridges.

The insect caching means is preferably retained in position by retaining means which may be regularly spaced. In a preferred embodiment the retainers are spaced and shaped to receive a castellated insect capture means allowing it to be positioned in a two step process comprising aligning the castellated paper with the retainers and then sliding it down so it is retained in position.

The back housing is designed to comprise or allow for the fitting of one or more of, for example, an electrical IEC socket, a heat sink, mounting means, air vents and cable stowage.

Preferably the cover is translucent and comprises an innermost surface which helps maximise UV emission from the trap as claimed in EP1457111.

More preferably it is adapted to ensure the lights are not readily visible through the cover as claimed in EP0947134. To this end, in a particularly favoured embodiment the cover comprises louver openings angled to prevent the lights being visible when viewed substantially perpendicularly to a plane of the back housing. A more favoured arrangement is one in which the louver openings are paired about a centre point to provide a downward and upward inflexion respectively. Such an arrangement helps to draw air in at the bottom of the trap.

According to a second and independent aspect of the present invention there is also provided a trap for catching insects comprising
a. a back housing;
b. a plurality of lights; and
c. a cover wherein said trap is adapted for ease of servicing and jet cleaning by the provision of shields each of which sealably protect, from water ingress, a plurality of lights at the positions where they connect to electrical fittings.

Preferably, the shields are secured in position by fittings which can be released manually.

A preferred trap comprising these shields further comprises the advantageous features described with respect to the first aspect of the invention.

According to a third and independent aspect of the present invention there is also provided an insect catching means comprising at least two insect capture surfaces, a first surface of which is one colour or shade, and a second surface, which is designed to facilitate ease of counting and or identification of captured insects, which is a different colour or shade to the first surface.

Preferably the second surface can be easily detached from the first surface for record keeping, there being a line of weakening e.g. perforation, between the first and second surface.

In a preferred embodiment the second surface includes a non-glued area which can have date written or easily appended thereto, such as date of use information. Preferably the second surface is a light colour or shade designed to highlight the captured insects, and more preferably contains grid lines to facilitate easy determination of insect number per given area.

Preferably the first surface is a darker shade or colour to absorb light and make captured insects less visible to someone viewing the trap through e.g. a cover.

The various aspects of the invention will be described further, by way of example, with reference to the following figures in which.

DETAILED DESCRIPTION

Figure 5:
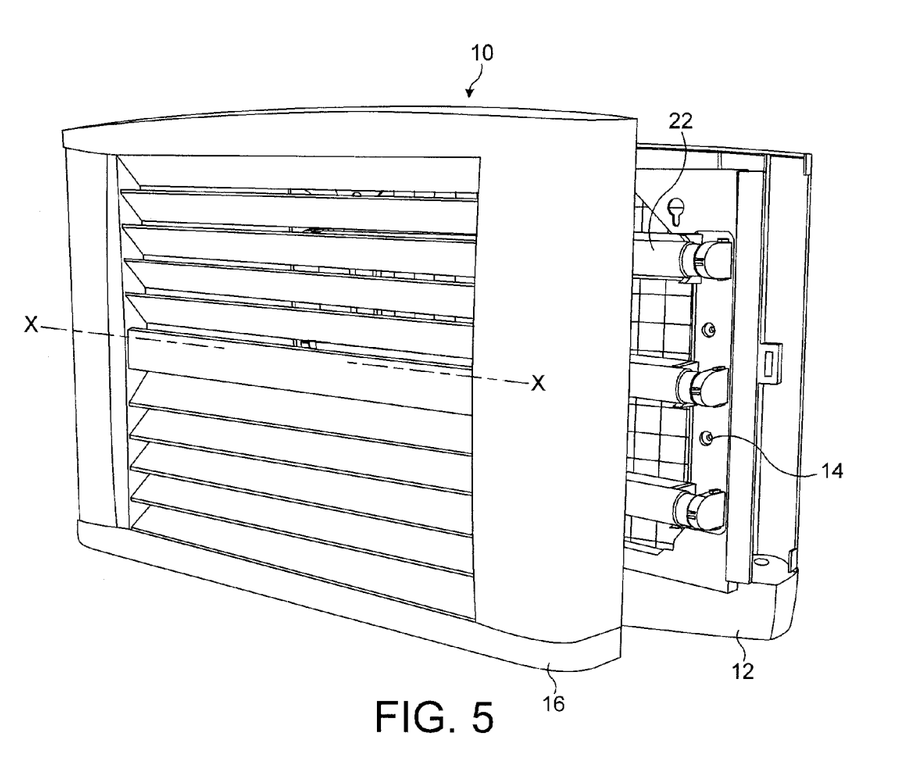
FIG. 5 is an exploded perspective view of the insect trap of FIG. 1 showing the cover being removed and the frame slightly open (without the shields of the second aspect)

Referring to the Figs an insect trap (10) according to a first aspect of the invention comprises three basic components: a back housing (12); a frame (14) and a cover (16). These are clearly illustrated in FIG. 5. The frame (14) is a perimeter frame (FIG. 3), comprising upper (14a) and lower (14b) frame members and two side members (14c; 14d). The perimeter frame (14) is swing, swivel or hinge mounted to the back housing (12) via a swing mechanism (20) which is substantially hidden (FIG. 2).

Figure 3:
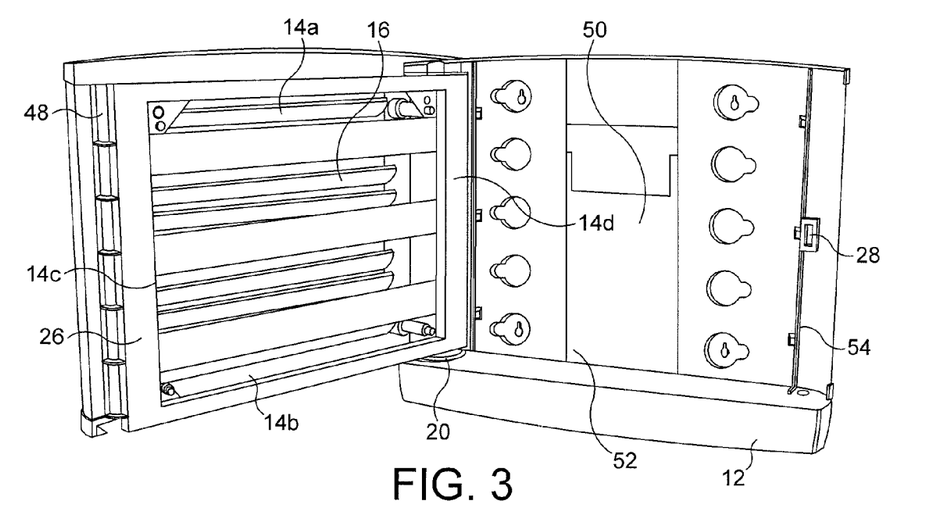
FIG. 3 is perspective view of the insect trap of FIG. 1 with the cover and frame open to a much greater extent and with no glue paper present.
Figure 4:
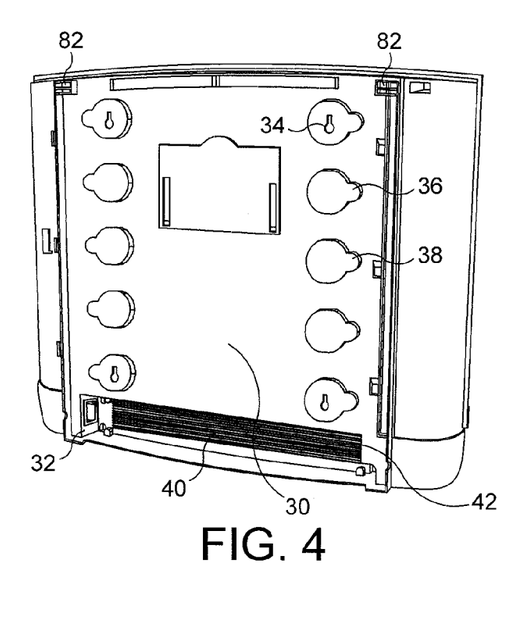
FIG. 4 is rear view of the insect trap of FIG. 1.
Figure 6:
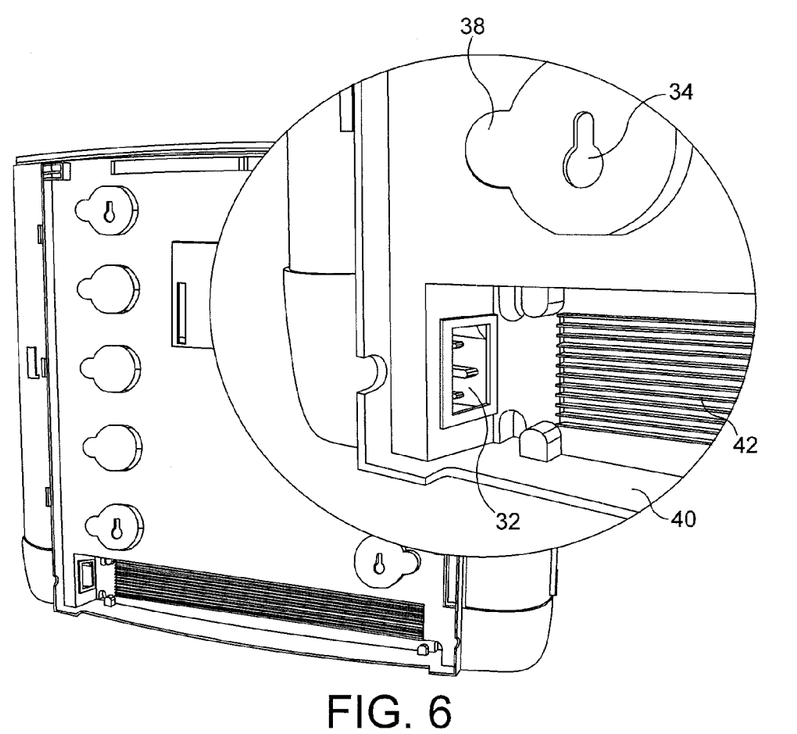
FIG. 6 is view of the rear of the back housing with the lower left side shown enlarged.

A plurality of 15 W or 25 W UV lights (22), three are illustrated in the example, are connected to paired electrical fittings (24a; 24b) (FIG. 2), and wiring (not shown) runs in channels or conduits (not shown) which are sealed by rubber or silicon gaskets (not shown) and enclosed by fascia plates (26) (FIG. 3) which are preferably metallic such that they provide rigidity to the moulded plastics frame. The metal also allows the frame to be held shut against a magnetic contact (28) provided on the back housing (12). The wiring runs through the swing mechanism (20) (which is hollow) into the back housing (12) where it exits the rear face (30) at an IEC socket (32) (FIGS. 4 and 6). The back housing is additionally provided with one or more key hole apertures (34) to facilitate mounting, ventilation conduits (36) and cable stowage arms (38). It also comprises a space (40) for a heat sink (not shown) and fluorescent high frequency electronic ballast (42).

Figure 1:
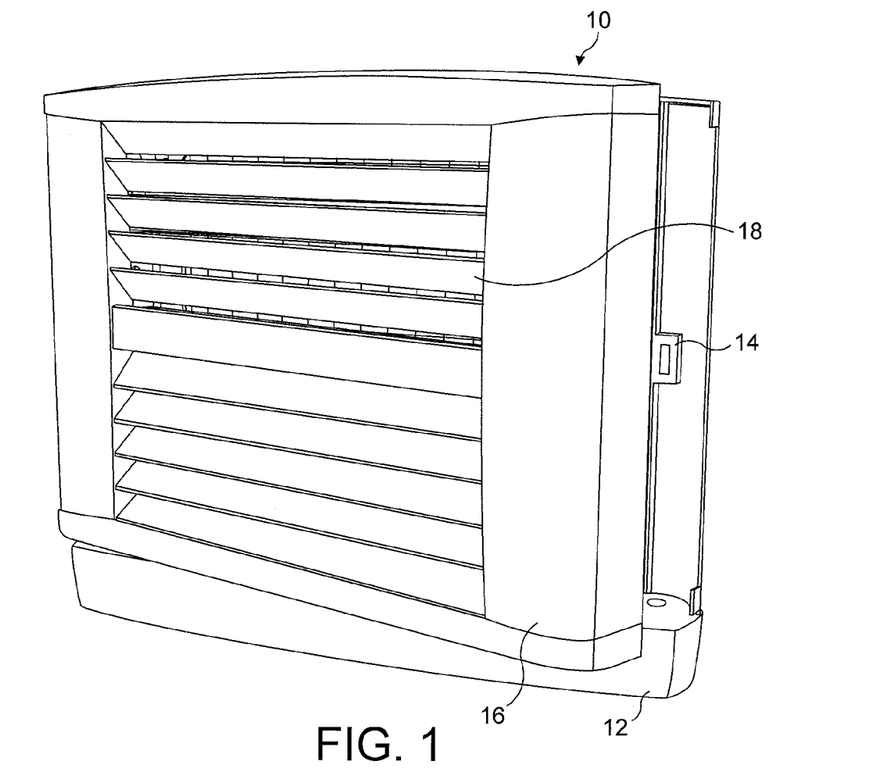
FIG. 1 is perspective view of an insect trap according to the first aspect of the invention with the cover on and frame slightly open.
Figure 2:
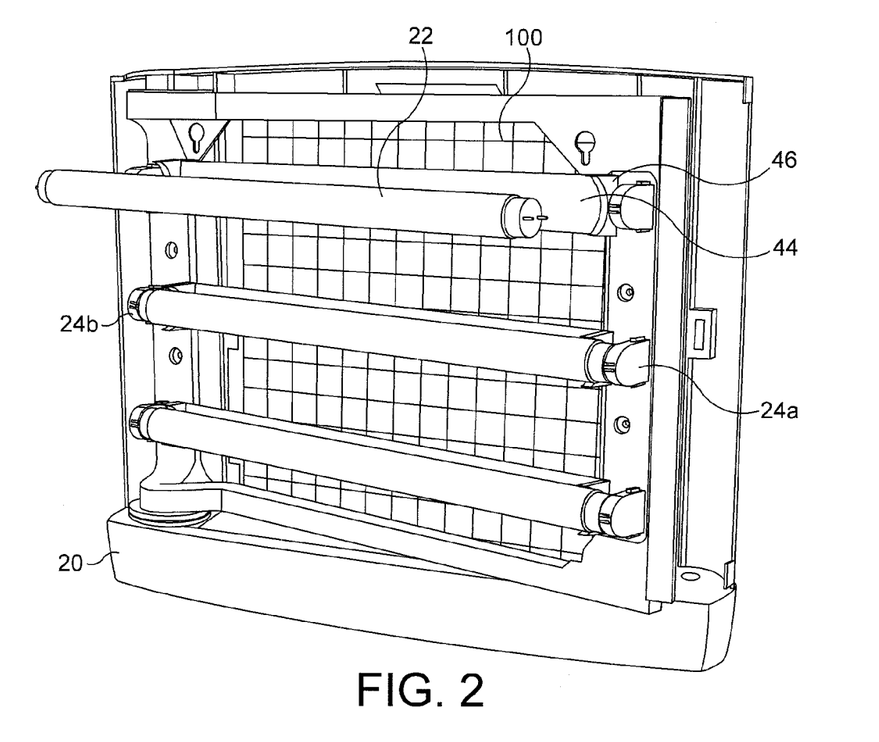
FIG. 2 is perspective view of an insect trap according to the first aspect of the invention with the cover removed.

Behind each light (22) there is provided a reflector (44) which is held in place by stops (46) which enable the reflectors to be sprung mounted thereby facilitating ease of removal for cleaning (FIG. 2). An insect capturing means (100), in the form of e.g. a castellated adhesive paper (FIG. 11) can be easily fitted and/or removed by swinging open the frame (14) and cover (16) of the closed trap (FIG. 1) by placing ones fingers under a flange (48) which extends from the perimeter frame member (14c) opposite the hinged frame member (14a) to an open position as shown in FIG. 3. An adhesive paper (100) can then be fitted to the inner face (50) of the back housing (12) over ridges (52) by pushing it over shaped retaining pegs (54) and moving it in a downwardly direction such that the paper is held in place by the pegs (54). To remove the paper the paper is lifted to align the castellation with the pegs before pulling it over the pegs.

The cover (16) is made of a translucent material and has an innermost surface which is shaped or roughened to maximise the transmission of UV light as set out in EP1457111. The openings (18) which allow insects in are louvered and are angled to prevent the lights (22) being visible when viewed substantially perpendicularly to the normal plane of the back housing (12). The general principle of maintaining a pleasant appearance of trap is set out in EP0947134 but the use of louvers is a further improvement in this regard. In particular, the louver openings (18) are paired about a centre axis (x-x) to provide a downward and upward inflexion respectively of between 30 and 60°.

Figure 7:
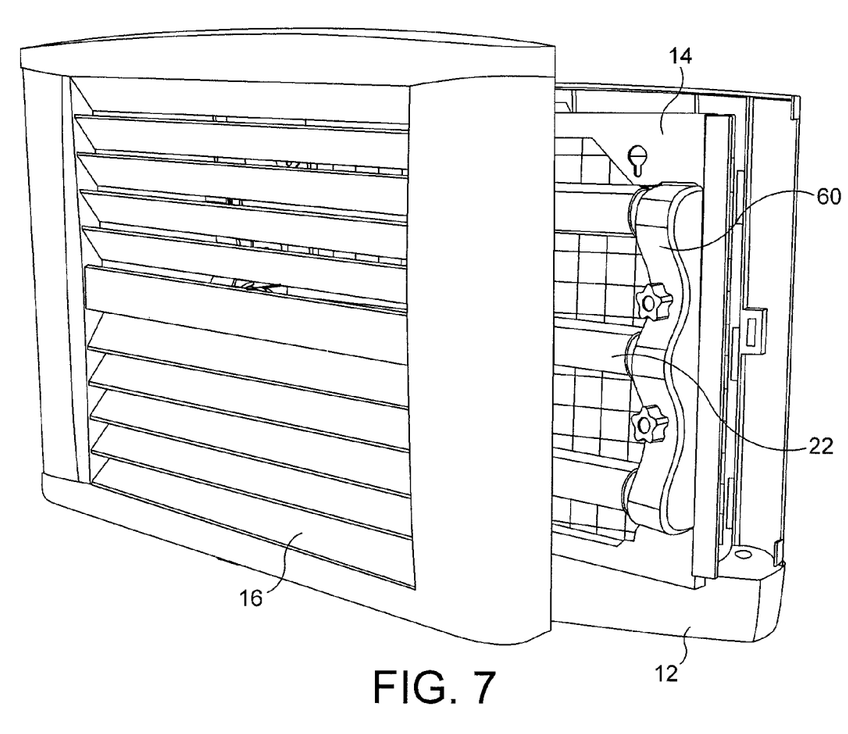
FIG. 7 is an exploded perspective view of the insect trap of FIG. 1 showing the cover being removed and the frame slightly open (with the shields of the second aspect in place)
Figure 8:
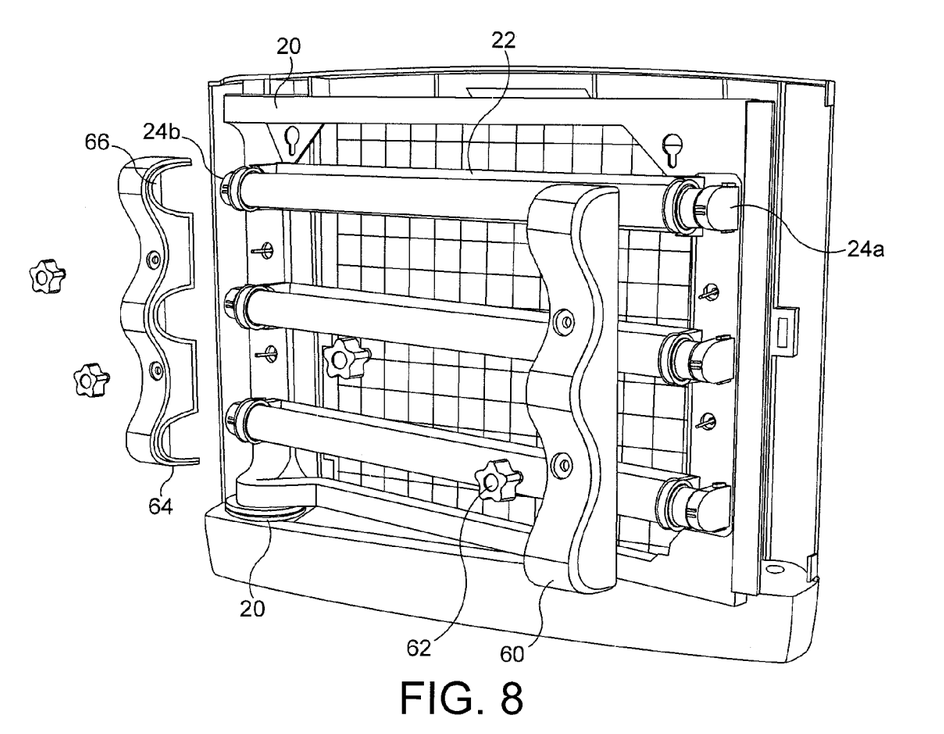
FIG. 8 is an exploded perspective view of the insect trap of FIG. 1 with the cover removed, the frame slightly open and the shield of the second aspect of the invention about to be fitted.
Figure 9:
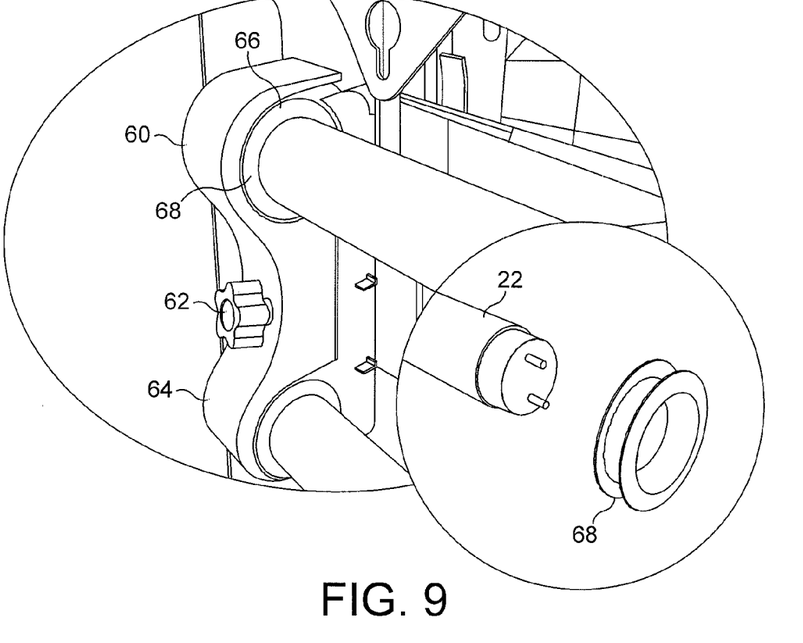
FIG. 9 is a detailed partial view of the shield of the second aspect of the invention in its fitted position.

The second and an independent aspect of the invention illustrated by the insect trap is most clearly illustrated with reference to FIGS. 7-9. It relates to a trap which need not comprise a frame (14) swing mounted to the back housing (12) as per the first aspect of the invention. It addresses the issue of trap serviceability and simplifies the seal mechanism around a trap comprising a plurality of lights (22) and paired electrical fittings (24a; 24b) making the trap well suited to jet washing (to IP65 requirements). Rather than seeking to place a sealed fitting around each contact point, instead shields (60) are fitted around a plurality of lights (22) and a plurality of electrical fittings (24a or 24b) to sealable protect a plurality of contacts simultaneously against water ingress. In this manner two single shields (60) can be removed to access a plurality of lights. In addition to speeding up the process of changing the lights the provision of two manually operable screw fittings (62), which face outwardly and are readily accessible to service personnel, simplifies the change. Thus, each shield (60) comprises a shaped housing (64) comprising a plurality of generally arcuately shaped recesses (66) which are designed to sealingly sit over silicon sealing members or gaskets (68) (FIG. 9) which are fitted about the lights (22) such that when the shields are secured in place over the sealing members (68) the connections are made water tight.

Figure 10:
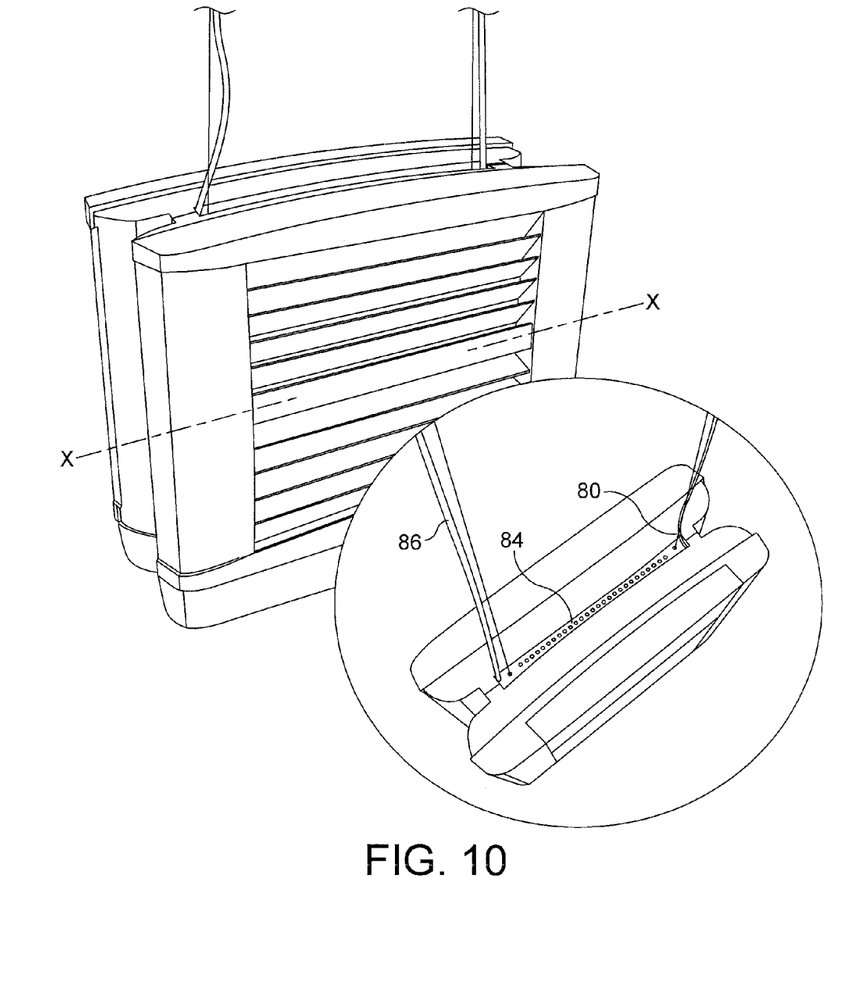
FIG. 10 is a schematic showing two traps linked back to back for suspension mounting.

The traps are designed such that two traps can be connected via a connector (80) (FIG. 10) which slots into apertures (82) in the rear face (30) of the back housing (12). The connector (80) comprises a plurality of apertures (84) running there through allowing cables (86) to be used to suspend the traps.

Figure 11:
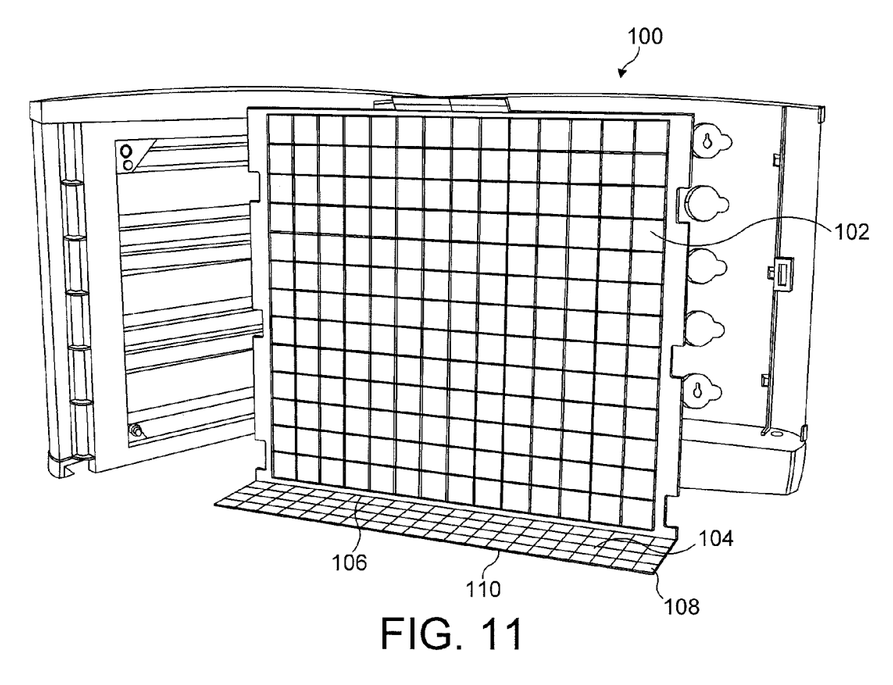
FIG. 11 is perspective view of the insect trap of FIG. 3 with an insect catching means of the third aspect of the invention being fitted.

Referring to FIG. 11, the insect capture means (100), according to the third aspect of the invention, is designed to facilitate identification of and/or counting of captured insects and record keeping. It comprises at least two insect capture surfaces (102; 104), a first surface of which (102) is one colour or shade, preferably black or a dark colour, and a second surface (104) of which is designed to facilitate ease of counting and or identification of captured insects and which is most preferably white or a light shade, as most insects are dark.

Preferably, the second surface (104) is easily detached or otherwise separated from the first surface (102) for record keeping, there being a line of perforations (106) or other means facilitating folding and separation, between the first (102) and second (104) surface.

The second surface includes a non-glued area (108) outside of grid lines (110) for insertion of data, such as date of use information. The grid lines are of a regular size, e.g. 2.5 mm$^2$ to facilitate data capture, such as, number of insects per given area.

The second surface (104) can be at any position but it is preferred to position it within the trap at a position which reflects either average or maximum capture. Maximum capture is likely to occur at the bottom of the trap and accordingly, in the embodiment illustrated, the second surface is the surface which folds to catch falling insects.

The invention claimed is:

1. An insect trap, comprising
a back housing;
a frame swing mounted to said back housing, the frame including at least one of ducting and channels in fluid-tight communication with the back housing to prevent water ingress; and
a cover comprising at least one opening allowing insects to enter the trap in a closed position, wherein said frame supports at least one light such that said frame and each light are moved from a first position, where they overlie the back housing, to a second position, where they lie clear of the back housing such that an insect catching means, which is fitted over the back housing is readily accessible for replacement during servicing.

2. The insect trap according to claim 1, wherein said frame supports at least one reflector behind each light in a manner allowing quick release.

3. The insect trap according to claim 2, wherein the reflectors are supported by opposing stops, which are accessed by flexing the reflectors.

4. The insect trap according to claim 1, wherein the frame is a perimeter frame and comprises a flanged handle at a side opposite to a hinged side.

5. The insect trap according to claim 1, wherein the back housing accommodates a fluorescent high frequency electronic ballast.

6. The insect trap according to claim 1, further comprising a means for connecting two traps back to back such that they can be suspended.

7. The insect trap according to claim 1, further comprising a means for locking the frame to the back housing in the first position and a means for controlling the extent of opening.

8. The insect trap according to claim 1, further comprising a mechanism which prevents removal of the cover until the frame has been moved from its first position.

9. The insect trap according to claim 1, further comprising a mechanism for raising an insect capture means from an inner face of the back housing at at least one point.

10. The insect trap according to claim 1, further comprising an insect capture retaining mechanism.

11. The insect trap according to claim 10, wherein the insect capture retaining mechanism comprises at least one peg for receiving a castellated insect capture means.

12. The insect trap according to claim 1, wherein the back housing further comprises at least one of an electrical IEC socket, a heat sink, a mounting mechanism, ventilation conduits and cable stowage arms.

13. The insect trap according to claim 1, wherein the cover is translucent and comprises an innermost surface, which helps maximize UV emission from the trap.

14. The insect trap according to claim 1, wherein the cover comprises at least one louver opening angled to prevent the lights being visible when viewed substantially perpendicularly to a plane of the back housing.

15. The insect trap according to claim 14, wherein the louver openings are paired about a centre point to provide a downward and upward inflexion respectively.

16. An insect trap, comprising:
a back housing;
a frame swing mounted to the housing;
a cover including at least one opening allowing insects to enter the trap in a closed position, wherein the frame supports at least one light such that the frame and each light are moved from a first position, where the frame and each light overlie the back housing, to a second position, where the frame and each light lie clear of the back housing such that an insect catching means, which is fitted over the back housing is readily accessible for replacement during servicing; and
a mechanism preventing removal of the cover until the frame is moved from the first position.

17. The insect trap according to claim 16, wherein the frame supports at least one reflector disposed behind each light via opposing stops, wherein the at least one reflector is spring mounted on the opposing stops allowing quick release.

18. The insect trap according to claim 16, wherein the frame comprises a perimeter frame including a flanged handle arranged on a side opposite a hinged side.

19. The insect trap according to claim 16, wherein the back housing accommodates a fluorescent high frequency electronic ballast.

20. The insect trap according to claim 16, wherein the back housing includes a rear face having apertures for receiving a connector, the connector configured to adjoin a second insect trap.

21. The insect trap according to claim 16, wherein the frame includes at least one of: (i) a side member configured to engage the back housing to secure the frame to the back housing in the first position, and (ii) a swing mechanism configured to control an extent of opening relative to the back housing.

22. The insect trap according to claim 16, further comprising an insect capture retaining mechanism.

23. The insect trap according to claim 22, wherein the insect capture retaining mechanism includes at least one peg for receiving a castellated insect capture means.

24. The insect trap according to claim 16, wherein the cover is translucent and includes an innermost surface configured to maximize UV emissions.

25. The insect trap according to claim 16, wherein the cover includes at least one louver opening angled to prevent the light being visible when viewed substantially perpendicularly to a plane of the back housing.

* * * * *